(12) United States Patent
Oliveau

(10) Patent No.: US 7,664,681 B1
(45) Date of Patent: Feb. 16, 2010

(54) METHOD AND DEVICES FOR SALES OF GIFT CARDS AND FOLDER GREETING CARDS

(76) Inventor: Avital Oliveau, 4412 Deseret Dr., Woodland Hills, CA (US) 91364

( * ) Notice: Subject to any disclaimer, the term of this patent is extended or adjusted under 35 U.S.C. 154(b) by 251 days.

(21) Appl. No.: 11/935,292

(22) Filed: Nov. 5, 2007

(51) Int. Cl.
*G06Q 40/00* (2006.01)
(52) U.S. Cl. .......................................... 705/26; 705/30
(58) Field of Classification Search ............. 705/10–42
See application file for complete search history.

(56) References Cited

U.S. PATENT DOCUMENTS

| | | | |
|---|---|---|---|
| 4,440,298 A | 4/1984 | Knight | |
| 4,622,768 A | 11/1986 | Moreau | |
| 4,840,275 A | 6/1989 | Faiola et al. | |
| 5,954,369 A * | 9/1999 | Seabrook | 283/117 |
| 6,493,970 B1 | 12/2002 | McCarthy et al. | |
| 6,640,473 B1 | 11/2003 | Shenk | |
| 6,666,378 B2 * | 12/2003 | Davila et al. | 235/487 |
| 7,204,048 B2 | 4/2007 | Kershner et al. | |
| 7,370,076 B2 * | 5/2008 | Friedman et al. | 709/203 |
| 7,561,299 B2 * | 7/2009 | Elarde et al. | 358/1.7 |

\* cited by examiner

*Primary Examiner*—Frantzy Poinvil

(57) ABSTRACT

The present invention is method of cooperative selling by way of displays of gift cards of multiple offering entities by adjacent to said displays other items which complement or enhance the gift giving impression upon a potential buyer of one or more gift cards.

6 Claims, 5 Drawing Sheets

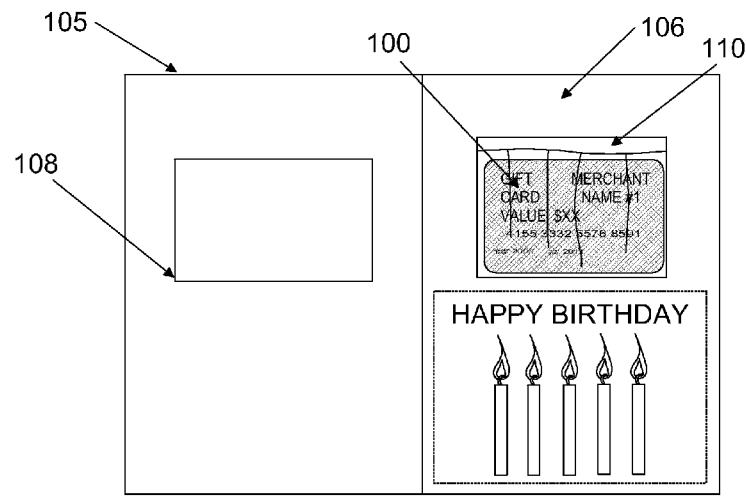
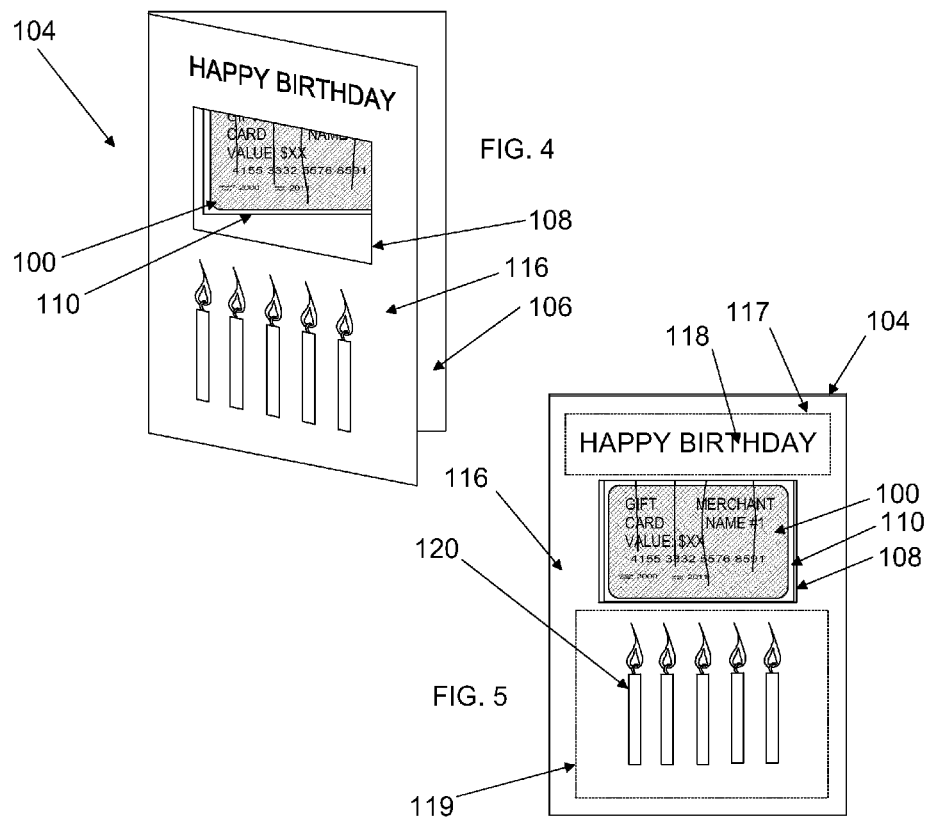

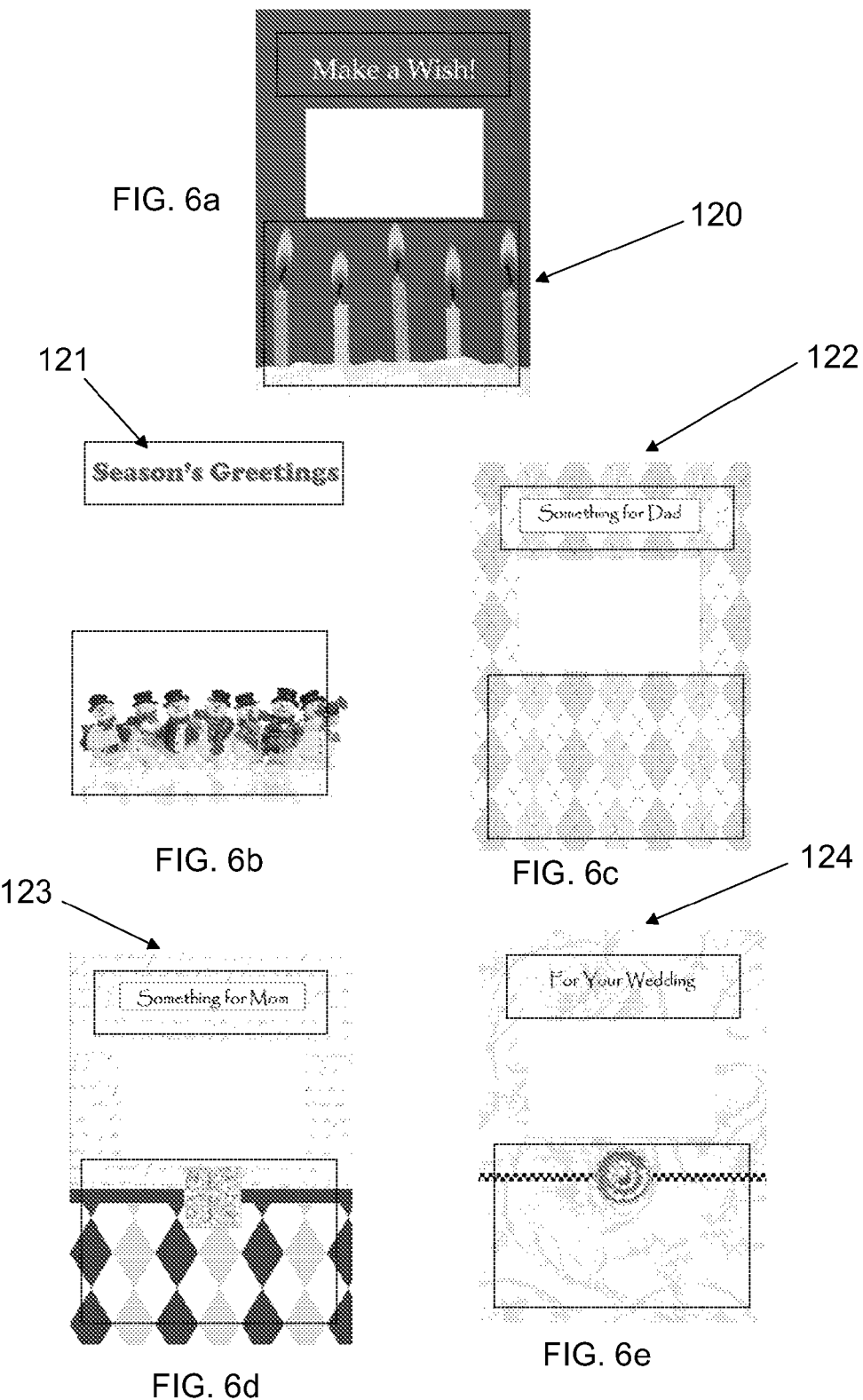

METHOD AND DEVICES FOR SALES OF GIFT CARDS AND FOLDER GREETING CARDS

FIELD OF THE INVENTION

The present invention relates to methods of enhancing sales of coupon or gift cards. More particularly, the present invention relates to methods for co-offers for sale of coupon or gift cards with other cost items.

BACKGROUND OF THE INVENTION

Coupon or gift cards are well known as providing to a holder the right to redeem a dollar value represented by the gift card with one or more specified retail merchants or for providing credit for purchases as a credit card with a limit equal to a purchased value. As a gift, gift cards which are retailer-specific reflect an emotionally substantial effort of a giver to appreciate the preferences of a recipient. In contrast, delivery of a gift of cash or check may be thought, under the circumstances of a rather personal relationship, to indicate lack of care or personal consideration in choosing a gift. The overwhelming popularity of gift cards as gifts confirms their effectiveness in emotional giving terms.

Gift cards have become so ubiquitous and desirable that they are presently available outside of channels owned or controlled by the retail business entity who offers them. As an example, coin counting machines offer users an option of obtaining a cash amount (less a very substantial service fee) or to obtain a gift card from one of multiple retail entities offering instant delivery of a gift card in the exact amount of the coins counted. Further, retail locations which themselves do not regularly offer gift cards for their own businesses (such as drug stores or grocery stores) currently may provide a space at a front of the store location for a display of multiple gift cards from several different business entities, each offering more than one gift card reflecting multiple dollar denominations to induce a purchaser into purchasing at least one gift card.

The costs of distribution, careful accounting, and redemption of gift cards outside of commercial channels owned or controlled by the business entities offering such gift cards have been shown to be rather small compared with the benefits, in that redemption percentages tend to be rather low. Failure of a bearer to redeem their gift card results in a clear profit for the issuer in the amount received from its sale. Even so, profit actually received by an issuer of a gift card is typically less than the face value or purchase value for that gift card. The issuer has a cost of production and distribution of a secure form of a gift card. The final point of sale of the gift card can be through a retail merchant who is otherwise not associated with the issuer, where such a retail merchant will receive a portion of the face value or purchase price of the gift card in order to induce the retail merchant to promote and sell such gift cards.

Gift cards are presently made in the form factor of a standard credit or debit card and bear a magnetic strip upon which to record relevant activation and redemption information upon purchase of the gift card. A front surface of each gift card prominently displays the trade name or trademark of the business entity offering the gift card, which mark presentation is intended to promote and advertise the products of the distributing business entity. It is critical to the distributing business entity that the mark presentation be viewed as many times as possible under circumstances that require a viewer to focus on such a mark presentation. Where multiple gift cards are offered in a vertical or inclined display, the gift cards are supported in a holder or tray so that the front surfaces of the gift cards are easily visible to a potential purchaser.

The retail business location where multiple gift cards are displayed and offered for sale are highly motivated to induce their purchase. The offering locations do not incur any direct costs for the gift cards in that a general distributor provides both the display as well as the cards and maintains inventory of gift cards and their overall appearance.

The retail business locations where multiple gift cards are displayed and offered for sale have the capacity with minimal investment of time to add other items for sale in their retail business. Where these offering locations are retail stores such as drug stores or grocery stores, cooperative selling of products is well-known. For instance, a drug store will present for sale bandages next to antibiotic ointments. A grocery store will place on adjacent store shelves the packages of pasta with pasta sauces.

It is now a well known concept to present an easily visible display of gift cards of multiple, different and typically non-competing business entities, whose variety is critical to attracting the buyer as to a favored offering business entity, whereafter a buyer may find other entity's gift cards that are desired. The presence of gift cards of so many offering entities in a single display is a further example of cooperative selling.

There is a need in furthering the concept of cooperative selling in the presentation of gift cards of multiple offering entities to attract a potential buyer of gift cards to such a display and provide additional inducement to purchase such cards.

SUMMARY OF THE INVENTION

The present invention is directed to expanding cooperative selling opportunities presented by displays of gift cards of multiple offering entities by providing adjacent to said displays other items which complement or enhance the gift giving impression upon a potential buyer of one or more gift cards. Alternately, cooperative selling of gift cards of a single entity for gift cards with one or more redemption values is provided by selling a gift card and a greeting card together, where the greeting card comprises a folded sheet having two interior surfaces, a left sheet defining a gift card opening about the size of a gift card and a right sheet having gift card support means for receiving a purchased gift card and maintaining it in such a position that, when the greeting card is closed, a front surface of the gift card is viewable through the gift card opening to a viewer. In an embodiment preferred for fungibility, a greeting card lacks indicia of a commercial entity issuing the gift card but instead bears, on a front outside surface, text or graphic devices indicating that the greeting card is given to relate to a special occasion. In an alternate embodiment, the greeting card bears an entity identification text or graphic device on the front surface of the greeting card.

It is well known that gift cards may be purchased supported on a rigid paper or plastic card to enhance the perceived value to a rather small plastic gift card. Such a practice is well known for small items, i.e., using a cardboard backed blister pack for tubes of lip gloss. However, such support cards are sometimes eliminated in displays where gift cards of more than about 5 or 10 multiple retail offering companies must be congregated in a compact area such as an end cap of a grocery or drug store. In such compact displays, cards are arranged in small, open-topped containers in the manner of business card holders and attached to a vertical wall so that the name of the offering business entity or company is clearly visible above a top rim of the card holder. Including cardboard or plastic holders for those gift cards necessarily would expand the size of the card holders and also expand the overall size of the vertical display wall. This is unacceptable in retail stores offering hundreds of other items. All vertical space which is diverted from shelf space to gift card displays must produce revenue greater than that of general merchandise of the store in which the gift cards are being offered for sale. Any such vertical display wall space diverted from traditional shelf space must independently produce substantial revenue from the products offered there. The most commercially valuable vertical wall space in a grocery, drug or department store are the end caps most visible to passing customers. To divert such space from a current use for presentation of gift cards requires substantial proof of revenue producing potential.

Similar to end cap space in retail stores is screen display space of a browser software window which offer multiple gift cards. That display space on a top portion of a web page shown on a display produced by browser software is the first and best opportunity to capture a viewer's attention to interest them in a sale of a product shown in that display. A website page displaying gift cards of multiple offering retail entities is even more limited in space which can be diverted from gift cards displayed than a typical end cap display in a retail store. Other items shown on the display are potentially distracting to a potential buyer of gift cards. Those other items displayed at the same horizontal level as gift cards in a website page must complement and induce a sale of gift cards instead of providing distraction to a viewer to an alternate product.

It is critical that greeting cards match in a substantial manner the conformity which presents itself to a buyer in gift card sizes among many entities offering them. A unitary display presenting itself to an unsophisticated and easily distracted buyer must be instantly appreciable in the extent of its offerings. In a display which is too "busy" or complicated, a purchaser encountering said display in a store housing hundreds of other items, which other items are the primary reason for the purchaser's visit, will pass by or ignore that effectively complex display. For that reason, the invention display standardizes greeting cards format to that which simplifies the overall look into an attractive, not distractive, whole. A first form of the invention provides for multiple, folding holiday or special event greeting cards bears text immediately identifying said holiday or special event in a heading on a topmost print zone of a front face of the greeting card. In a preferred embodiment, adjacent and immediately below the topmost print zone is defined a gift card viewing opening rectangular in form and slightly smaller than the form factor of a gift card so that edges of the viewing opening overlay a top surface of the gift card to provide a pleasant appearance in the context of a greeting card. Adjacent and immediately below the topmost print zone is a bottom graphic zone wherein are printed graphic devices immediately associable with the holiday or special event in the top print zone.

A single glance at such cards where bold and oversize text in a single line above a conceptually congruent graphic device (sans text) having an opening the size of the adjacent gift cards instantly conveys to the buyer the idea that greeting cards for a special occasion are being offered for sale with the gift cards, making the effect of the giving act more affective. A rather plain display of gift cards alone is thereby enhanced in its attraction potential by the presence of multiple, standardized greeting cards adjacent to those gift cards in the same display frame. A potential buyer's eyes can quickly alternate between easily identifiable special occasions represented in the greeting cards (birthday, Christmas/Hanukkah, anniversary, etc.) and those retail business entities represented in the available gift cards. The combination dramatically engages a viewer to focus longer on the overall display in activating memories not only for determining a retail business entity whose gift card would be desirable to an intended recipient but also whether one of the special occasions represented by the greeting cards is applicable for the present date ranges into the near future. Completing the mental exercise to make a match between the desired retail entity and a special occasion increases the chances that a viewer will want to complete a transaction for the greeting card and the gift card.

In addition, the very prominent displays for the gift cards of a relatively large number of offering entities are attractive and relatively novel for today's busy shopping customers who can thereby conveniently be reminded of and have available a desirable gift from those several offering entities. The invention enhances and improves the likelihood of a sale of gift cards by providing a greeting card packaging. As retailers have previously found, sales of small items are enhanced when they are mounted on larger supporting background cards.

Greeting cards having multiple sizes or formats in such an overall display are conceptually damaging to the viewer's interest in an overall display including gift cards and greeting cards adapted to present a folded gift card through an opening in an upper front surface of the greeting card. A viewer typically will have less than one to two seconds to absorb the intent of the overall display as they pass by. The invention standardization of the greeting card format in combination with multiple entities in the available gift cards creates a cooperative selling opportunity heretofore unrealized in the prior art.

BRIEF DESCRIPTION OF THE DRAWINGS

FIG. 3 is the greeting card of FIG. 2 bearing the gift card of FIG. 1 in a clear plastic envelope on a back part of the open greeting card.

FIG. 4 is a perspective view of a partly closed greeting card and gift card as in FIG. 3.

FIG. 5 is a front view of the greeting card and gift card as in FIG. 3 in a closed position.

FIGS. 6a through 6e are front views of five different greeting cards without a gift card of a form shown in FIG. 5, each presenting to a viewer a different, well-known special occasion.

DETAILED DESCRIPTION OF THE INVENTION

The invention is now discussed with reference to the figures.

Figure 1:
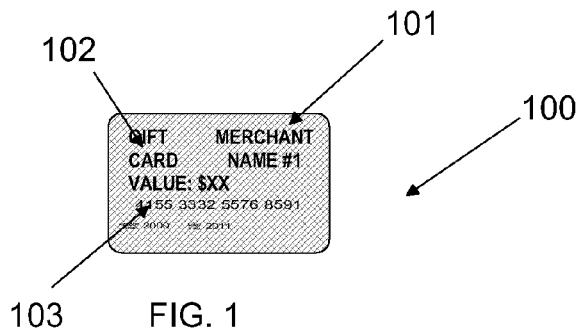
FIG. 1 is a front view of an exemplary gift card.

FIG. 1 is a front view of a thin, plastic gift card 100 bearing merchant and/or trademark text and/or graphics information 101, gift card value information 102, and card number information 103. Gift card 100 comprises a well known legal obligation of a retail business entity identified in information 101 to provide its bearer with goods or services equal to the value of information 102. Preferred dimensions of gift card 100 are 3⅜ inches in length and 2⅛ inches in height.

Figure 2:
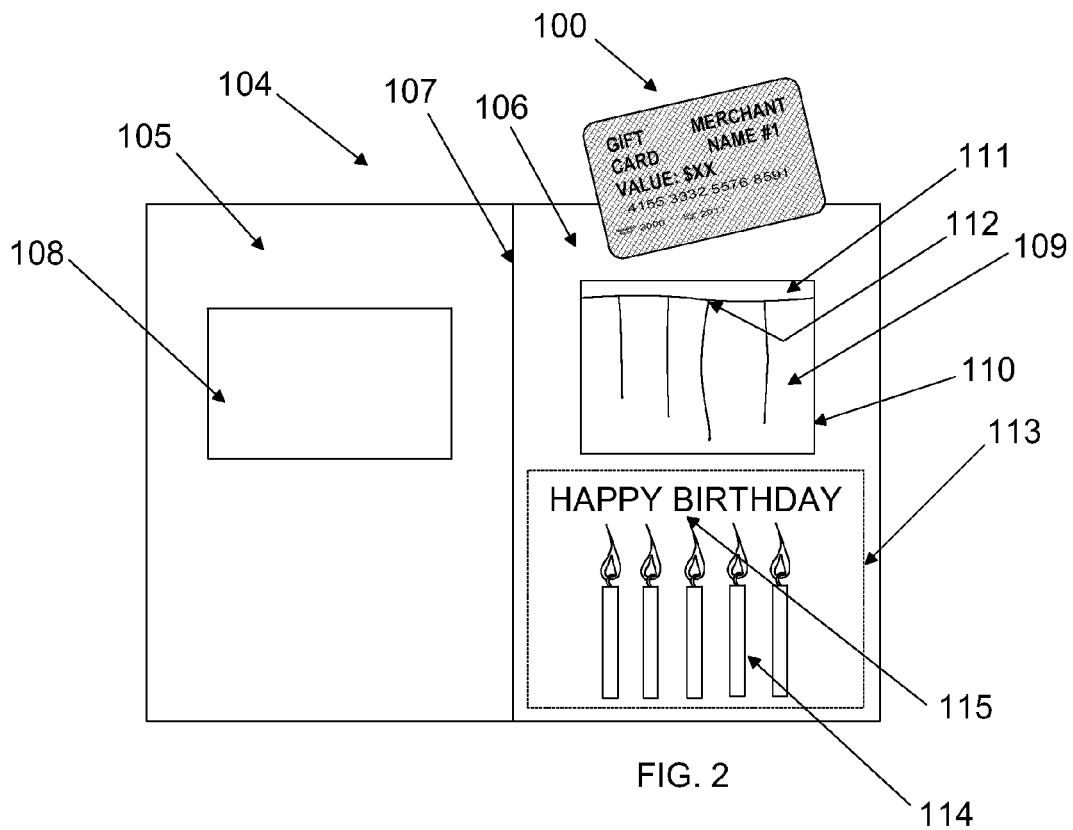
FIG. 2 is an open view of a standardized greeting card according to the invention.

FIG. 2 is an open view of a standardized greeting card 104 comprising an inside view of front section 105 and back section 106 joined at fold 107. Front section 105 defines an opening 108 which is slightly smaller (up to ⅛ inch smaller) than the length and height of gift card 100 shown angled with respect to envelope 110. Envelope 110 comprises a back sheet 111, which adhesively secured to back section 106, and a front sheet 109 that is joined at its side and bottom edges to back sheet 111 to form a pocket between front sheet 109 and back sheet 111 defining a top opening 112. Top opening 112 is adapted to receive gift card 100 into the pocket between front sheet 109 and back sheet 111 to support gift card 100 in a fixed position on back sheet 106. Once placed in envelope 110, gift card 100 is located as shown in FIG. 3, easily removable from top opening 112 when greeting card 104 is in the open position but cannot be removed when greeting card 104 is in a closed position. In addition, FIG. 2 shows a text and graphic zone 113 bearing repetition of text and graphics on a front surface of front section 105.

FIGS. 4 and 5 show gift card 100 respectively in a partly closed and fully closed positions, where a front surface 116 is shown and whereby opening 108 defines an area about ⅛ inch smaller than an outer perimeter of gift card 100 secured in position in envelope 110. Closure of front section 105 against back section 106 prevents gift card 100 from slipping out of envelope 110. FIG. 5 shows a preferred presentation of a gift card 100 held by greeting card 104. Front surface 116 bears a text section 117 immediately above opening 108, which is immediately above graphic section 119. Text 118 in text section 117 consists of one to four words representing an identification of a well known special occasion, i.e., "HAPPY BIRTHDAY" in FIG. 5. Graphic device 120 in graphic section 119 contains no text but instead contains graphics supporting, further identifying or reinforcing the concept of the special occasion identified in text section 117, i.e., five lit candles in graphic section 119 supporting, identifying and reinforcing the concept of a birthday in text section 117.

FIGS. 6a through 6e are front surfaces of five different greeting cards without a gift card of a form shown in FIG. 5, respectively 120, 121, 122, 123 and 124, each presenting to a viewer a different, well-known special occasion. Specifically, each of greeting cards 120, 121, 122, 123 and 124 comprise, descending in view from a top edge of the front surface, a text section containing one to four words immediately bringing to mind a special occasion, an opening through which is viewed a gift card (inserted later by a purchaser) secured in a clear plastic envelope attached to a back section, and a graphic section for presentation of graphic devices supporting, identifying and reinforcing the concept of the special occasion in the superior text section. FIG. 6a shows the phrase "MAKE A WISH!" in the text section and is supported as a birthday greeting by the images of lit candles in the graphic section below the opening for presentation of the gift cards. FIG. 6b shows the phrase "SEASON'S GREETINGS" in the text section and is supported as a Christmas/Hanukkah greeting by the images of snowmen musicians in the graphic section below the opening for presentation of the gift cards. FIG. 6c shows the phrase "SOMETHING FOR DAD" in the text section and is supported as a Father's Day greeting by the images of conservative plaid-like graphics in the graphic section below the opening for presentation of the gift cards. FIG. 6d shows the phrase "SOMETHING FOR MOM" in the text section and is supported as a Mother's Day greeting by the images of fancy script and scroll work in the graphic section below the opening for presentation of the gift cards. FIG. 6e shows the phrase "FOR YOUR WEDDING" in the text section and is supported as a wedding gift greeting by the images of stylized Rococo images in the graphic section below the opening for presentation of the gift cards.

Figure 7:
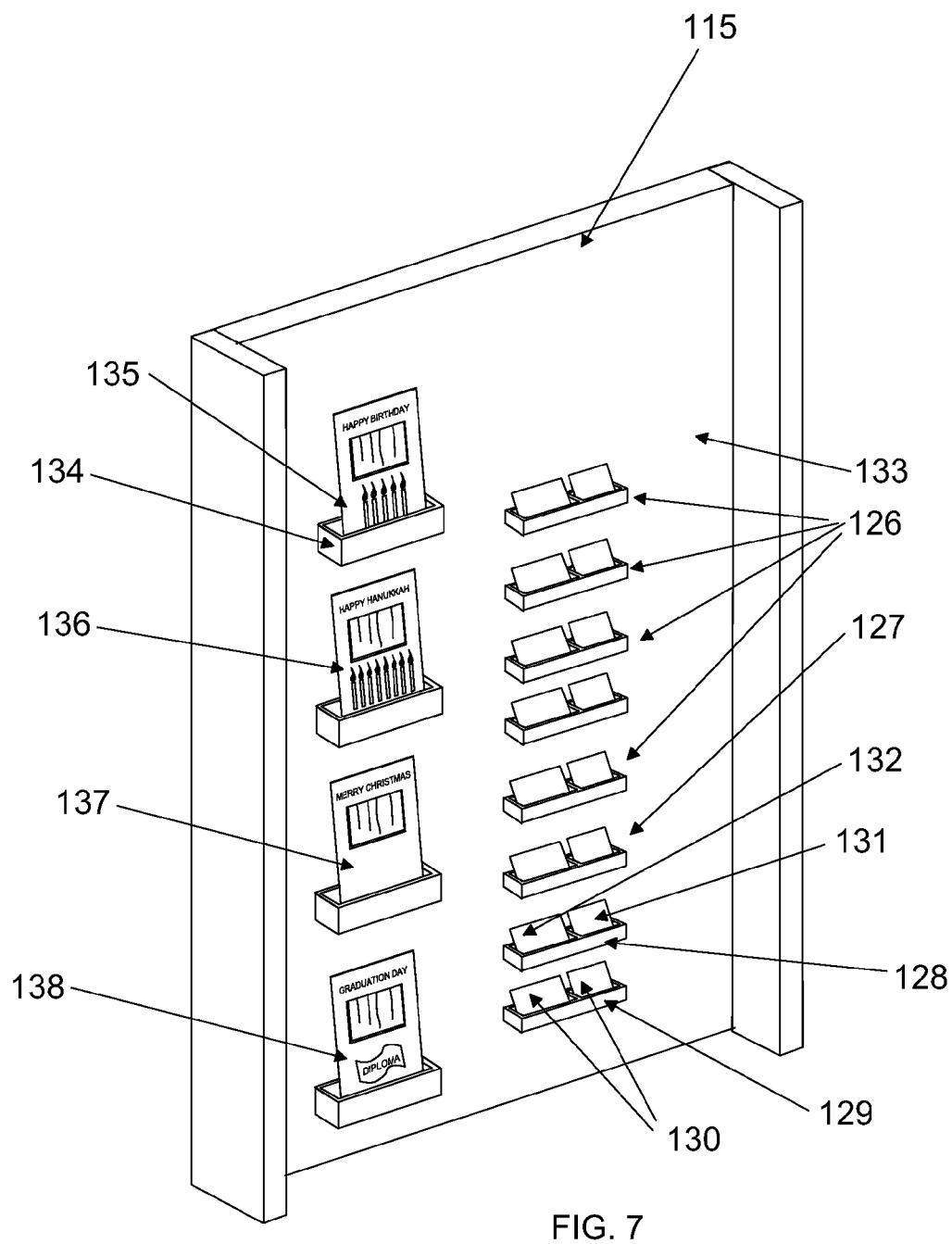
FIG. 7 is a perspective view of a generalized end cap display of the invention greeting cards adjacent in advertising frame view to gift cards of multiple retail entities.

FIG. 7 is a perspective view of a generalized end cap display 115 of the invention greeting cards 135-138 supported in trays 134 adjacent in advertising frame view to gift cards of multiple retail entities in gift card trays 126-129. The overall presentation of standardized gift cards 135-138 for, respectively, birthday, Hanukkah, Christmas, and graduation special occasions dramatically improves the attractiveness and desirability of continued viewing as compared to a display having only the gift cards of multiple retail entities in gift card trays 126-129. The two sets of gift cards 130 in tray 129 represent gift cards of two different denominations, one denomination per tray, of the same retail entity. The two sets of gift cards 131 and 132 in tray 128 represent gift cards of two different retail entities. The other sets of gift cards in trays 126 and 127 may be of different denominations or other retail entities than those shown in trays 128 and 129. It is intended that at least three different standardized greeting cards according to the description above and at least three sets of separately presented gift cards representing at least two different retail entities should be presented in a display 115 to be effective for the objects of the invention. Display 115 may consist of a vertical back 133 supported and visually framed at vertical ends by vertical sides.

In use, a viewer will pass in front of display 115, review greeting cards 135-138 and the gift cards of multiple retail entities, selecting for purchase a standardized greeting card and a gift card, thereafter inserting a purchased gift card into an envelope of the greeting card, moving the greeting card into a closed position and delivering the combination of the greeting card and gift card to a recipient of the gift.

Figure 8:
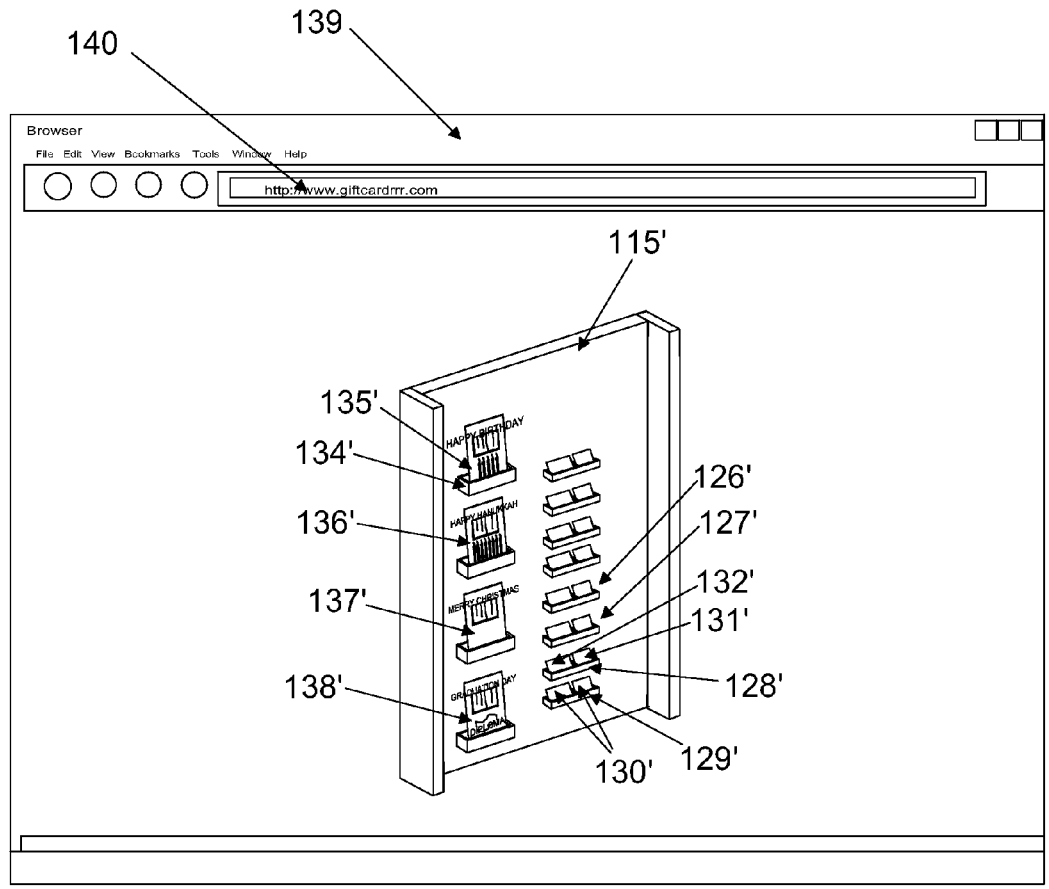
FIG. 8 is a virtual view of the display of FIG. 7 in a window display by way of browser software on a user's computer and display screen by way of Internet connection to a website providing activatable links at each of the representations of greeting cards and gift cards.
Figure 9:
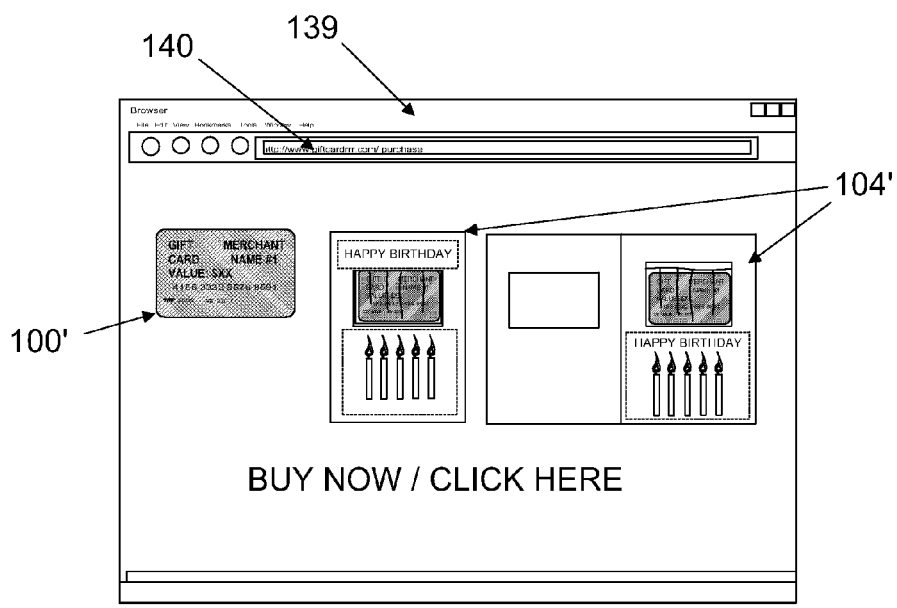
FIG. 9 is a web page viewable by a user of the computer and display of FIG. 8 where a selected gift card and greeting card are visible to a user before they are purchased for delivery as a package to a recipient at a recipient's address.

FIG. 8 is a virtual view 115' of the display 115 of FIG. 7 in a display of a screen presentation 139 by a viewer of a computer monitor, where the screen presentation is output by way of Internet browser software on the viewer's computer linked in communication via a packet network with a server accessible at address 140. Referring to FIGS. 7 and 8, each item identified and described by aspects 126-132 and 134-138 in FIG. 7 is equivalently present in virtual version a screen display 115' by aspects 126'-132' and 134'-138'. Greeting cards 135'-138' represent links activatable that, by moving a cursor to their location on the screen and clicking or otherwise activating that link, indicates a desire to purchase one such greeting card. Likewise, gift cards 130'-131' (and others shown thereon) represent links activatable that, by moving a cursor to their location on the screen and clicking or otherwise activating that link, indicates a desire to purchase one such gift card. FIG. 9 shows a subsequent screen presentation to a viewer of the screen presentation of FIG. 8, where in FIG. 9 are shown enlarged and multiple views of the selected greeting card 104' and a front view of the selected gift card 100'. Upon completing purchase transaction steps subsequent to activating the link represented by the phrase "BUY NOW/CLICK HERE", an entity responsible for the presentations in FIGS. 8 and 9 cause to be delivered to a gift recipient's address the selected greeting card and the gift card secured in the envelope of the greeting card.

The invention also comprises an embodiment wherein the greeting card is a single sheet of supportive material such as card stock or plastic and is essentially a front section as described above with a front surface defining a gift card opening and bearing the text and graphic devices described above. A pair of relatively rigid, opposing, adjacent and clear plastic sheets are bound to peripheral edges of the gift card opening, in effect forming a dual-paned window over the gift card opening. A vertical slot is defined at a right or left side of one or both of said plastic sheets adapted to receive a short edge of a gift card so that said gift card can be inserted into the space between the dual-pane window, thereby securely supporting and presenting its front surface for viewing. Alternately, a horizontal slot is defined at a top section of one or both of said plastic sheets adapted to receive a long edge of a gift card so that said gift card can be inserted into the space between the dual-pane window, thereby securely supporting and presenting its front surface for viewing. Said gift card/greeting card can be further provided with sealing means (such as tape or overlapping plastic flaps) for securely sealing either the vertical or horizontal slot when a gift card is inserted into the space defined by the dual-paned window. Such sealing means permit the single support sheet embodiment of the invention to be more vigorously handled in delivery to a recipient.

The above design options will sometimes present the skilled designer with considerable and wide ranges from which to choose appropriate apparatus and method modifications for the above examples. However, the objects of the present invention will still be obtained by that skilled designer applying such design options in an appropriate manner.

I claim:

1. A method for offering for sale and selling one or more standardized greeting cards and gift cards of one or more retail entities comprising:
   (a) each standardized greeting card comprising a front section and a back section joined by a fold which allows them to be moved from a closed position to an open position, where, in a closed position a front surface of the front section bears, in descending and adjacent order moving from a top edge to a bottom edge of the front surface, a text section bearing a phrase one to four words in length identifying a special occasion, a rectangular opening defining an opening just smaller than a form factor of the gift cards, and a graphic section bearing graphic devices without text supporting the concept of said special occasion;
   (b) each gift card comprising a form factor with a front face identifying by name or trademark a retail business entity and a dollar amount representing, when purchased, an obligation of said retail business entity to provide goods or services in said dollar amount;
   (c) each standardized greeting card further comprising a clear envelope attached to an inside surface of the back section and adapted to receive and supportively present one gift card so that, with the greeting card in a closed position and the gift card inserted in the envelope, the front face of the gift card is viewable through the rectangular opening as between the text section and the graphic section; and
   (d) using a computer, presenting in a viewable display the greeting card or cards and the gift card or cards adjacent to each other.

2. The method of claim 1 wherein multiple sets of greeting cards are presented in said display, each set viewable by a representative first card and each set representing different special occasions.

3. The method of claim 2 wherein multiple sets of gift cards are presented in said display, each set viewable by a representative first card and each set representing different retail entities.

4. The method of claim 3 wherein there are three or more sets of greeting cards and three or more sets of gift cards.

5. The method of claim 4 wherein the display is located at an end cap position in a retail store whose ownership is not identical with any of the retail business entities.

6. The method of claim 1 wherein the display is virtual by way of a screen presentation of browser software on a viewer's computer linked by packet network communication to a server maintained by an offering entity offering for sale the greeting card or cards and the gift card or cards, such that a viewer's purchase of a greeting card and a gift card as single purchase results in deliver of said single purchase items to a recipient's address.

* * * * *